United States Patent
Shirai et al.

(10) Patent No.: US 6,411,641 B1
(45) Date of Patent: Jun. 25, 2002

(54) FARADAY ROTATOR FOR USE WITH HIGH ENERGY LASERS

(75) Inventors: Kazushi Shirai; Norio Takeda, both of Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/370,926

(22) Filed: Aug. 10, 1999

(30) Foreign Application Priority Data

Aug. 17, 1998 (JP) ............................................. 10-230688

(51) Int. Cl.[7] ................................................. H01S 3/08
(52) U.S. Cl. ............................. 372/98; 372/703; 372/39
(58) Field of Search ............................. 372/106, 98, 7, 372/703, 39; 385/12

(56) References Cited

U.S. PATENT DOCUMENTS 6,128,423 A * 10/2000 Shirai ........................... 385/12

\* cited by examiner

*Primary Examiner*—Leon Scott, Jr.
(74) *Attorney, Agent, or Firm*—Sughrue Mion, PLLC

(57) ABSTRACT

A high-energy laser Faraday rotator is used in an optical system in which the Faraday rotator absorbs laser light energy of more than 20 mW. The Faraday rotator includes a bismuth-substituted rare-earth iron garnet single crystal film grown as a Faraday rotator by using a liquid phase epitaxial method, and non-magnetic substrate having a side surface on which the bismuth-substituted rare-earth iron garnet single crystal film is formed.

5 Claims, 2 Drawing Sheets

FARADAY ROTATOR FOR USE WITH HIGH ENERGY LASERS

BACKGROUND OF THE INVENTION

The present invention relates to a Faraday rotator for use with high-energy laser light.

DESCRIPTION OF THE RELATED ART

Recently, optical fiber communications and optical instrumentation have taken a giant leap forward. Semiconductor lasers and solid state lasers are most commonly used light sources for optical fiber communications and optical instrumentation. Lasers have a serious disadvantage that the oscillation becomes unstable if there is reflect light return, i.e., the laser light is reflected by, for example, the end surface of the optical fiber and returns to the laser element. In order to solve this problem, an optical isolator is provided at the exit of the laser light, thereby blocking the reflect light return to stabilize oscillation of the laser source.

Optical isolators are usually constructed of a polarizer, an analyzer, a Faraday rotator, and a permanent magnet that causes the Faraday rotator to be magnetically saturated. The Faraday rotator plays a critical role in the optical isolator and takes the form of a bismuth-substituted rare-earth iron garnet single crystal (referred to as BIG hereinafter) film having a thickness in the range from several tens of microns to 450 microns, grown by the liquid phase epitaxial (referred to as LPE herinafter) method. Such bismuth-substituted iron garnet single crystals include $(HoTbBi)_3Fe_5O_{12}$ and $(TbBi)_3(FeAlGa)_5O_{12}$.

A BIG is usually grown by the LPE method as follows:

A crucible made of a noble metal is placed in the middle of an LPE apparatus in the form of a vertical furnace. Iron garnet compositions such as ferric oxides and oxides of rare-earth elements are introduced into the crucible together with flux materials including lead oxide, boron oxide, and bismuth oxide.

The oxides are heated to about 1000° C. to provide a melt, which is subsequently used to grow a BIG. Then, the melt is cooled to about 800° C. so that the melt is super-saturated. Then, a non-magnetic garnet substrate is attached to a substrate holder and slowly lowered from the upper part of the LPE furnace until the non-magnetic garnet substrate comes into contact with the surface of the melt. The substrate is then rotated in contact with the melt so that a garnet single crystal is epitaxially grown on the undersurface of the substrate. After the garnet single crystal having a desired thickness has grown, the substrate is lifted several centimeters above the surface of the melt and is spun at a high speed to spin-remove most of the melt adhering to the substrate. Then, the substrate is taken out from the LPE furnace.

The BIG obtained in this manner is subjected to the polishing process to separate the substrate from the BIG. During the polishing process, the BIG is polished to a desired thickness. The substrate is separated from the as-grown BIG, to obtain as thin a Faraday rotator as possible and to eliminate Fresnel reflection that occurs in the interface between the substrate and the BIG so that the transmittance of the Faraday rotator is as high as possible. Then, anti-reflection films are formed on both sides of the crystal by vacuum vapor deposition. Finally, using a dicing machine or a scriber, the crystal film is cut into small sizes of, for example, 1.5 mm×1.5 mm.

The BIG is excellently transparent to light in the near infrared region but has large light absorption depending on wavelengths. For example, if the Faraday rotation of the BIG is 45 degree, then the BIG has a loss of about 1 dB at room temperature for light having a wavelength of 1,064 nm generated by a YAG laser using $Y_3Al_5O_{12}$. The energy of light absorbed by the BIG is converted into heat, which in turn increases the temperature of the BIG.

If the laser power is low, for example, less than 1 mW, the temperature rise of the BIG is negligible.

However, signal light for optical fiber communications in the 1,550-nm range, generated by the YAG laser or excited by an optical fiber amplifier referred to as erbium doped fiber amplifier (abbreviated as EDFA), often has a power of several hundred milliwatts. When such high-power light is incident on the BIG, the temperature of the BIG may increase significantly so that the temperature rise is no longer negligible.

The temperature rise of BIG causes some problems. For example, the isolation of an optical isolator decreases. The Faraday rotation of a Faraday rotator is temperature dependent. Thus, the Faraday rotation varies with increasing temperature of the BIG, causing changes in the isolation performance of the optical isolator.

Another problem is that the insertion loss increases since the light absorption coefficient of the BIG increases with increasing temperature. If the heat generated in the BIG is not dissipated sufficiently, the temperature of the BIG increases extremely so that the antireflection film may become detached or the BIG may become damaged. Thus, the BIG cannot be applied as a Faraday rotator if the laser in use has very high power.

SUMMARY OF THE INVENTION

An object of the invention is to develop BIG that can be used as a Faraday rotator for use with high power laser light.

A high-energy laser Faraday rotator is used in an optical system in which the Faraday rotator absorbs an amount of laser light energy more than 20 mW. The Faraday rotator includes a bismuth-substituted rare-earth iron garnet single crystal film grown as a Faraday rotator by using a liquid phase epitaxial method, and non-magnetic substrate having a side surface on which the bismuth-substituted rare-earth iron garnet single crystal film is grown.

The Faraday rotator absorbs an amount of energy of laser light in the range from 20 to 600 mW.

The non-magnetic garnet substrate has a thickness in the range from 0.2 to 0.8 mm.

An optical isolator may incorporate the high-energy laser Faraday rotator of the invention, wherein the Faraday rotator is assembled with the BIG film positioned on the light incidence side (high energy laser side) and the non-magnetic substrate on the light exiting side (remote from the high energy laser).

The optical isolator includes a polarizer, a Faraday rotator, and an analyzer, all being aligned in this order from a laser side, and adjacent elements being assembled in intimate contact with each other.

Further scope of applicability of the present invention will become apparent from the detailed description given hereinafter.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

BIG is grown on a non-magnetic garnet substrate by the LPE method. The inventors carefully investigated the BIG and found that a Faraday rotator (i.e., BIG) having the non-magnetic garnet substrate not removed therefrom can be applied to very high power lasers. Then, the inventors further investigated the BIG and finally arrived at the present invention.

The present invention is directed to a Faraday rotator for use with high-energy lasers and to an optical isolator incorporating the Faraday rotator. The Faraday rotator is in the form of a bismuth-substituted rare-earth iron garnet single crystal film, grown by the LPE method with a non-magnetic garnet remaining attached to one side thereof after the growth of the BIG. The isolator incorporates the Faraday rotator oriented such that. the high-energy laser light is incident on the BIG film side and exits from the non-magnetic garnet side.

A Faraday rotator according to the present invention can safely absorb laser energy in the power range from 20 mW to 600 mW. The non-magnetic garnet substrate used in the present invention has a thickness in the range from 0.05 to 1.2 mm, preferably in the range from 0.2 to 0.8 mm. An optical isolator according to the invention has a polarizer or analyzer in intimate contact with the Faraday rotator, thereby increasing heat dissipation by conduction.

The invention will now be described in detail.

With optical isolators using a conventional BIG, heat generated in the optical isolator is transferred (1) by conduction through the BIG, (2) by convection through the air in contact with the BIG, and (3) by radiation into the air. Only a very small amount of heat is transferred by convection into the air due to the physical properties of air and substantially sealed construction of the isolator. The amount of heat lost into the air by radiation is also very small at actual operating temperatures. Thus, most of the heat generated in the optical isolator is lost through the BIG film by conduction.

Figure 1:
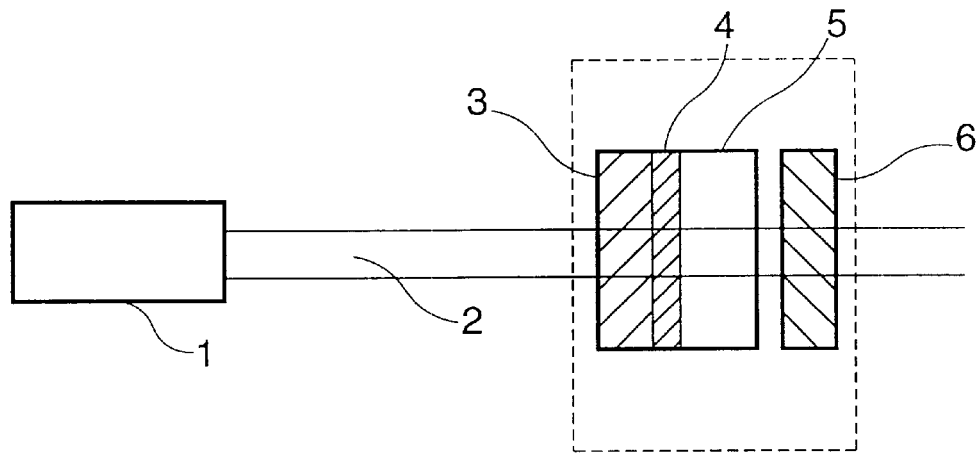
FIG. 1 is a model representation of an optical isolator according to the present invention.

As is clear from FIG. 1, the heat generated in the BIG is dissipated via the chassis of the optical isolator to the outside of the optical isolator.

Thus, the most efficient material in transferring heat seems to be one that is located between the BIG and the chassis and in direct contact with the BIG. Such a material is, for example, the non-magnetic garnet substrate that is used when growing BIG by the LPE method. Other useful materials are the polarizer and the analyzer that can be placed in contact with the BIG and are not detrimental to the function of optical isolator. The polarizer and analyzer are also assembled in contact with the chassis.

When a Faraday rotator with the garnet substrate not removed therefrom was exposed to YAG laser light having a wavelength of 1,064 nm, the temperature rise was much less than that of a conventional Faraday rotator with the garnet substrate removed.

FIG. 1 is a model representation of an optical isolator according to the present invention.

Referring to FIG. 1, the laser light 2 emitted from a high-energy laser is coupled to an optical isolator. The light 2 passes through a polarizer 3, a BIG film 4, a non-magnetic substrate 5, and an analyzer 6. Then, the light is coupled into, for example, an optical fiber. The BIG film 4 has the non-magnetic garnet substrate 5 not removed therefrom and the polarizer 3 is assembled in intimate contact with the BIG film 4, so that most of the heat generated in the BIG film is dissipated through the non-magnetic garnet substrate 5 and the polarizer 3.

The non-magnetic garnet substrate used in the present invention should be as transparent to light at the operating wavelengths of the optical isolator as possible. Such a garnet substrate can be selected from the non-magnetic garnet $[(GdCa)_3(GaMgZr)_5O_{12}]$ having a lattice constant in the range from 1.2490 to 1.2515 nm, sold under the trade name "SGGG substrate." The polarizer and analyzer used in the present invention should also be as transparent to light at the operating wavelengths of the optical isolator as possible. The polarizer and analyzer preferably have good heat transfer properties. Commercially available rutile polarizers and glass polarizers fulfil the requirements and can be selectively used according to required heat transfer characteristics.

Faraday rotators according to the present invention should be applied depending on the power of laser light that is absorbed by the Faraday rotator. In practice, the present invention is advantageously applied if the Faraday rotator absorbs power more than P=20 mW. The BIG according to the present invention is even more effective when the power absorption is in the range from 30 to 600 mW. Conversely, if the Faraday rotator absorbs a power less than 20 mW, the present invention is not quite effective since the temperature rise of the BIG is not significant. For power more than 600mW, the heat dissipation of the BIG according to the present invention is still not enough and an increase in temperature causes an increase in light absorption, which in turn causes a further increase in temperature.

When the present invention is practiced in making a Faraday rotator, the garnet substrate should be as thick as possible, preferably not subjected to polishing process unless the garnet substrate is too thick or the surface of the garnet substrate has been soiled. This is because the thicker the substrate is, the more heat is dissipated; the substrate is not quite effective as a heat sink if the substrate is 50 $\mu$m thick or less. The preferred thickness of the substrate is larger than 200 $\mu$m. A thickness larger than 1.2 mm will not improve the heat dissipating effect any further; the substrate should be preferably not more than 1.2 mm thick unless there is a particular reason. Still more preferable thickness is not more than 800 $\mu$m.

The present invention is not limited to a BIG having particular compositions but can be applicable to those having the following chemical formula (1). The substitution amount X of bismuth in formula (1) should be as large as possible, because the larger the value of X is, the thinner the BIG is and the smaller the insertion loss is correspondingly. The value of X is preferably at least larger than 0.8 and still more preferably larger than 1.1.

$$R_{3-x}Bi_xFe_{5-y}M_yO_{12} \tag{1}$$

where R is at least one element selected from the group consisting of Y, La, Ce, Pr, Nd, Sm, Eu, Gd, Tb, Dy, Ho, Er, Tm, Yb, and Lu, M is at least one element selected from the group consisting of Ga, Sc, Al, and In, and X has the range $0.5 \leq X \leq 2$ and y has the range $0 \leq y = 1.2$.

When an optical isolator incorporates a Faraday rotator according to the present invention, the Faraday rotator is assembled with the BIG positioned on the light source side. If the BIG is positioned on the light source side, light (about 1.4% of the total power) reflected by the interface between the BIG and the substrate is subjected to Faraday rotation by the BIG. Thus, the reflected light cannot pass through the polarizer. This implies that the reflected light can be dealt with as a part of the reflected light return from the outside of the optical isolator, being not detrimental to the isolation performance of the optical isolator. If the Faraday rotator is assembled with the substrate positioned on the light source side, the reflected light directly goes back to the light source, reducing the isolation performance of the optical isolator.

When the value of P is large, the absorption loss due to temperature rise is excess so that the BIG cannot be used in some cases. In such a case, more than one BIG film having a non-magnetic substrate not removed therefrom may be used for a total Faraday rotation of 45 degrees at the expense of decreased isolation.

Embodiment

The present invention will be described in detail by way of examples.

EXAMPLE 1

Using the LPE method, a $(HoTbBi)_3Fe_5O_{12}$ (referred to as BIG-1 hereinafter) having a thickness of 151 μm was manufactured as follows:

The following materials were introduced in a platinum crucible of 3,000ml capacity: 6,000 gm lead oxide (PbO, 4N), 6,960 gm bismuth oxide ($Bi_2O_3$, 4N), 918 gm ferric oxide ($Fe_2O_3$, 4N), 252 gm boron oxide ($B_2O_3$, 5N), 41.0 gm terbium oxide ($Tb_2O_3$, 3N), and 54.0 gm holmium oxide ($Ho_2)_3$, 3N).

The crucible was placed in the middle of a vertical furnace. The oxides were heated to a temperature of about 1000° C. and sufficiently blended into a homogeneous melt, which is subsequently used for growing a bismuth-substituted iron garnet single crystal.

Then, the melt was cooled to a temperature below a saturation temperature. Then, a non-magnetic garnet substrate of a 3-inch (111) garnet single crystal [$(GdCa)_3$ $(GaMgZr)_5O_{12}$] having a thickness of 500 μm and a lattice constant of 1.2497±0.0002 nm was held above the melt and was then lowered till the lower side of the substrate comes into contact with the melt. Then, the garnet single crystal was rotated so that a garnet single crystal was epitaxially grown on the undersurface of the substrate.

After the garnet single crystal having a desired thickness has been grown, the substrate was lifted using the method developed by the inventors (Japanese Patent Preliminary Publication No. 9-115721). According to the method, the grown BIG can be used as a Faraday rotator without being subjected to the polishing process after the growth. That is, the BIG film is rotated at a speed of 300 r.p.m. in the LPE furnace so that the BIG film was spun to spin-remove the most of the melt adhering to the substrate. Then, the substrate was quickly put in a slow-cooling furnace. Then, the temperature of the slow-cooling furnace decreased to 60° C., then taken out of the furnace.

The residual melt adhering to BIG-1 was dissolved and removed from BIG-1 using an aqueous solution of hydrochloric acid. The BIG-1 was 146 μm thick. Then, the 3-inch BIG-1 was cut into 28 pieces, all being of a 10.5 mm×10.5mm size (referred to as BIG-1D). Then, both substrate side and BIG side of BIG-1D were coated with an anti-reflection film having a center wavelength of 1,064 nm. Thus, Faraday rotators for 1,064 nm were manufactured. The Faraday rotator had a Faraday rotation of 45.7 degrees and an insertion loss of 0.85 dB at a wavelength of 1,064 nm.

One BIG-1D was arbitrarily selected from 28 BIG-1D and cut into pieces of a 5 mm×5 mm size (referred to as BIGF-1). BIGF-1 were tested to determine the relationship between the temperature of BIG in degrees Celsius and the insertion loss in decibels for the YAG laser light.

Figure 2:
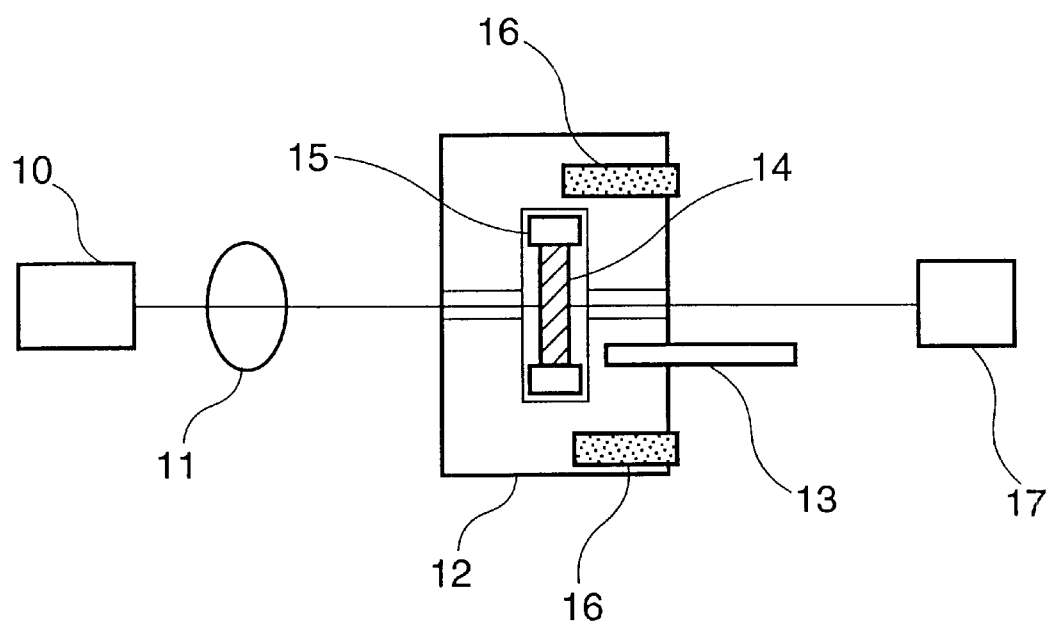
FIG. 2 illustrates a test set-up of Example 1.

FIG. 2 illustrates a test set-up.

Referring to FIG. 2, light emitted from a YAG laser 10 having a wavelength of 1,064 nm passes through a lens 11 and then through BIGF-1 14 supported by a cylindrical Sm—Co magnet 15. Then, the light is incident on a photodetector 17. Reference 16 denotes a heater. The laser light had a power of 0.2 mW and a beam diameter ($1/e^2$) of 1 mm. A heater block 12 was made in two-halves and has a hole in the middle through which the light passes.

BIGF-1 was placed in the middle of the cylindrical Sm—Co magnet 15 so that BIGF-1 is magnetically saturated. Then, the heater block 12 was attached to the assembly of BIGF-1 and the magnet 15. With the BIGF-1 exposed to the light emitted from the YAG laser, the relationship between the insertion loss and the temperature of BIGF-1 was investigated.

Table 1 lists the relationship between the temperature (°C.) of BIGF-1 and the insertion loss (dB).

| Temp. °C. | 25 | 50 | 75 | 100 | 125 | 150 | 175 | 200 | 250 | 300 |
|---|---|---|---|---|---|---|---|---|---|---|
| Loss dB | 0.84 | 0.89 | 1.02 | 1.16 | 1.46 | 1.79 | 2.3 | 2.9 | 4.3 | 5.9 |

Figure 3:
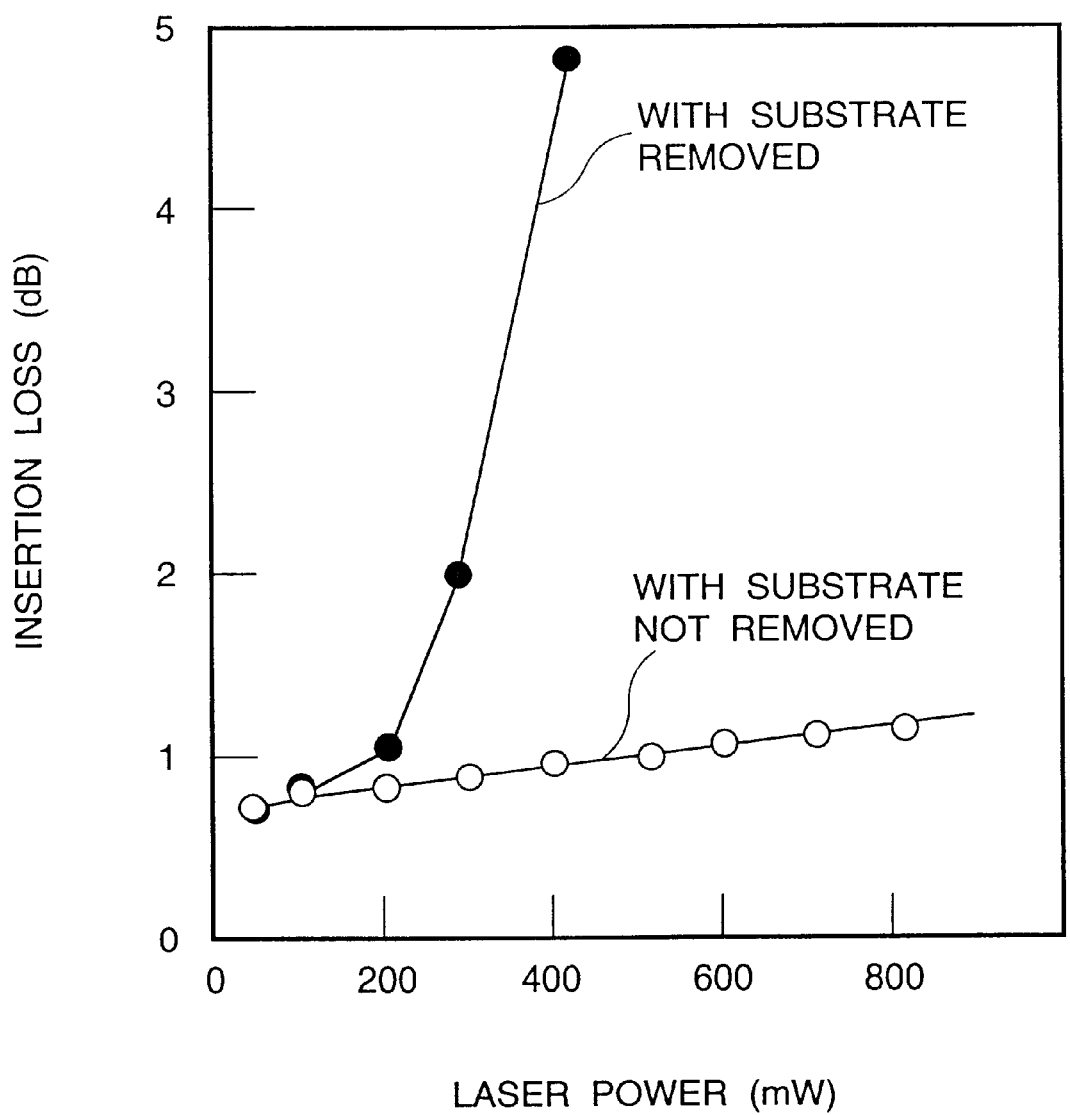
FIG. 3 illustrates the relationship between the power of laser light and insertion loss of BIG, showing Example 1 (with a substrate not removed) in white dots and Comparison (with a substrate removed) in black dots.

Then, the insertion loss was measured by increasing the laser power stepwise using the set-up shown in FIG. 2 with the heater block 12 removed. FIG. 3 shows the results (white circles). From the relationship between the temperatures and insertion losses in Table 1, it was concluded that the temperature of BIGF-1 at 500 mW was 75° C. and the temperature at 800 mW was 105° C. The Faraday rotation of BIGF-1 varies at a rate of 0.06 deg./°C. If an optical isolator was assembled and adjusted at room temperature (25° C.), the isolation would be 27 dB at 500 mW and 22 dB at 800 mW.

When isolators are used with a laser power of a particular value, the thermal equilibrium temperatures are within a fixed range. Thus, the BIG film may be made to a thickness such that the isolation is maximum at the middle of the range.

Then, the diameter of the laser beam was adjusted from 1 mm to 0.8 mm and then an experiment was conducted in the same way.

The experimental results were interpreted using the relation in Table 1, and it was concluded that the temperature of BIGF-1 was 80° C. at .500 mW and 110° C. at 800 mW.

Also, the diameter of beam was adjusted from 0.8 mm to 1.2 mm and then an experiment was conducted in the same way.

The experimental results were interpreted using the relation in Table 1, and it was concluded that the temperature of BIGF-1 was 65° C. at 500 mW and 100° C. at 800 mW.

EXAMPLE 2

An arbitrary one was selected from the remaining BIG-1D manufactured in Example 1. The selected BIG-1D was polished only on the substrate side such that the thickness of the substrate was 250 μm. Measurements were made in the same manner as Example 1 except that the diameter of the laser beam was 1.0 mm.

The experimental results were interpreted using the relation in Table 1, and it was concluded that the temperature of selected BIGF-1 was 105° C. at 500 mW and 135° C. at 800 mW.

EXAMPLE 3

Still another arbitrary one was selected from the remaining BIG-1D manufactured in Example 1. The selected BIG-1D was polished only on the substrate side such that the thickness of the substrate was 100 μm. Measurements were made in the same manner as Example 1 except that the diameter of the laser beam was 1.0 mm.

The experimental results were interpreted using the relation in Table 1, and it was concluded that the temperature of selected BIGF-1 was 140° C. at 500 mW and 180° C. at 800 mW.

Comparison

Yet another arbitrary one was selected from the remaining BIG-1D manufactured in Example 1. The BIG-1D was polished to remove the whole substrate of the selected BIG-1D and a slight depth of the side of BIG adjacent to the substrate. Then, in the same way as Example 1, the BIG-1D was coated with an anti-reflection film having a center wavelength of 1,064 nm on the substrate side and the BIG side. The BIG-1D was then cut into pieces (Faraday rotator) of a 5 mm×5 mm size (referred to as BIGF-C1). BIGF-C1 was 142 μm thick and was made as a Faraday rotator for use with a wavelength of 1,064 nm. At a wavelength of 1,064 nm, BIGF-C1 had a Faraday rotation of 44.1 degrees and an insertion loss of 0.82 dB.

BIGF-C1 was tested to determine the relationship between the temperature of BIG in degrees Celsius and the insertion loss in decibels. The test was carried out in the same manner except that the diameter of the laser beam was 1.0 mm.

Then, the relationship between power of laser light and insertion loss was investigated in the same manner as the other embodiments.

FIG. 3 illustrates in black dots the relationship between the power of laser light and insertion loss. Using the relationship between the insertion loss and temperature, it was concluded that the temperature of BIGF-C1 was 300° C. at 400 mW.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A high-energy laser Faraday rotator for use in an optical system, comprising:
   a non-magnetic substrate having a side surface; and
   a bismuth-substituted rare-earth iron garnet single crystal film on the side surface of said non-magnetic substrate, said bismuth-substituted rare-earth iron garnet single crystal film being formed by a liquid phase epitaxial method, and said Faraday rotator being able to absorb an amount of laser light energy of more than 20 mW.

2. The high-energy laser Faraday rotator according to claim 1, wherein the Faraday rotator is capable of absorbing an amount of laser light energy of from 20 to 600 mW.

3. The high-energy laser Faraday rotator according to claim 1, wherein said non-magnetic substrate has a thickness of from 0.2 to 0.8 mm.

4. The optical isolator comprising said high-energy laser Faraday rotator according to claim 1, wherein said Faraday rotator is oriented such that said bismuth-substituted rare-earth iron garnet single crystal film is positioned on a high-energy laser source side and said non-magnetic substrate is positioned on a side opposite from the high-energy laser source side.

5. The optical isolator according to claim 4, comprising a polarizer, the Faraday rotator, and an analyzer, all being aligned in this order from the high-energy laser source side, wherein the polarizer is in intimate contact with the Faraday rotator and the Faraday rotator is in intimate contact with the analyzer.

* * * * *